US012754830B2

(12) United States Patent
Agrawal et al.

(10) Patent No.: US 12,754,830 B2
(45) Date of Patent: Oct. 6, 2026

(54) EVALUATING READINESS LEVEL IN INDUSTRIAL FLOOR INFRASTRUCTURE AND AUTOMATION SOFTWARE

(71) Applicant: International Business Machines Corporation, Armonk, NY (US)

(72) Inventors: Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 18/201,680

(22) Filed: May 24, 2023

(65) Prior Publication Data

US 2024/0394173 A1 Nov. 28, 2024

(51) Int. Cl.

*G06F 11/3698* (2025.01)
*G06F 8/65* (2018.01)
*G06F 11/3604* (2025.01)

(52) U.S. Cl.

CPC ............ *G06F 11/3698* (2025.01); *G06F 8/65* (2013.01); *G06F 11/3608* (2013.01)

(58) Field of Classification Search

CPC ..... G06F 11/3698; G06F 8/65; G06F 11/3608
See application file for complete search history.

(56) References Cited

U.S. PATENT DOCUMENTS 7,818,405 B2 10/2010 Appaji
8,887,146 B2 11/2014 Hido et al.
9,425,627 B2 8/2016 Proud
10,228,932 B2 3/2019 Ozdemir et al.
11,200,045 B1 * 12/2021 Moyal .............. G05B 19/41885
11,880,676 B1 * 1/2024 Sandler ............... G06F 9/45558
2020/0310394 A1 10/2020 Wouhaybi et al.
2021/0157312 A1 * 5/2021 Cella ...................... G06Q 30/06
2022/0014946 A1 * 1/2022 Merwaday ............ H04W 16/22
(Continued)

OTHER PUBLICATIONS

Muller et al., "Industrial Autonomous Systems: A Survey on Definitions, Characteristics and Abilities," Automatisierungstechnik, vol. 69, No. 1, 2021, pp. 3-13.
(Continued)

*Primary Examiner* — Daxin Wu
(74) *Attorney, Agent, or Firm* — Eric W. Chesley

(57) ABSTRACT

Described are techniques for evaluating the readiness level in the industrial floor infrastructure and automation software to ensure that the appropriate automation software is being utilized to control the appropriate industrial floor infrastructure. A digital twin simulation is created and executed to analyze the capabilities of the industrial floor infrastructure in view of an update to the automation software to identify capabilities of the updated automation software that are utilized by the existing capabilities of the industrial floor infrastructure. Recommendations may then be provided to upgrade, replace, install and/or perform proactive maintenance of the industrial floor infrastructure to further utilize the capabilities of the updated automation software if the capabilities of the updated automation software are not being utilized with the existing capabilities of the industrial floor infrastructure at an acceptable level.

20 Claims, 5 Drawing Sheets

(56) References Cited

U.S. PATENT DOCUMENTS

| | | | | |
|---|---|---|---|---|
| 2022/0051171 | A1* | 2/2022 | Cella | G06N 5/04 |
| 2022/0100185 | A1* | 3/2022 | Karri | G05B 23/0229 |
| 2022/0100851 | A1* | 3/2022 | Mehrotra | G06F 8/65 |
| 2022/0163960 | A1* | 5/2022 | Cella | G05B 19/4185 |
| 2022/0334818 | A1* | 10/2022 | McFarland, Jr. | G06Q 10/063 |
| 2023/0086361 | A1* | 3/2023 | Wan | G06F 8/77<br>702/186 |
| 2023/0266733 | A1* | 8/2023 | Chillar | G05B 23/0283<br>700/87 |
| 2024/0201972 | A1* | 6/2024 | Rakshit | G06F 8/65 |
| 2024/0330529 | A1* | 10/2024 | Tabet | G06F 30/20 |
| 2024/0378331 | A1* | 11/2024 | Upadhyay | G06F 30/27 |
| 2024/0394281 | A1* | 11/2024 | Swanson | G06F 16/248 |

OTHER PUBLICATIONS

Fatima Mohammad Abulhussain, “A Study on Evaluating the Readiness Level for Qatar Companie to Adopt Industry 4.0,” Qatar University, College of Engineering, Jun. 2021, pp. 1-93.

Kretzschmar et al., “Evaluating the Readiness Level of Additively Manufactured Digital Spare Parts: An Industrial Perspective,” Applied Sciences, vol. 8, Oct. 2018, pp. 1-16.

Dave Riel, “Manufacturing Readiness Assessments,” Mar. 15, 2017, pp. 1-47.

Anonymously, “Method and System for Physically Authentically Workers on an Industrial Floor Based on Virtual Reality-Based Skills Vetting and Feedback Validation,” IP.com, IP.com No. IPCOM000271126D, Oct. 21, 2022, pp. 1-5.

Anonymously, “Method and System for Integrating Machines in an Industrial Space via intelligent Workflow Improvement,” IP.com, IP.com No. IPCOM000270567D, Jul. 18, 2022, pp. 1-5.

Anonymously, “Method and System for Dynamically Restoring Automation Capability in Any Machine by Using a Second Machine,” IP.com, IP.com No. IPCOM000269433D, Apr. 17, 2022, pp. 1-2.

Anonymously, “Method and System for Digital Twin-Based Simulation of Patient Readiness for Hospital Release,” IP.com, IP.com No. IPCOM000262585D, Jun. 12, 2020, pp. 1-5.

* cited by examiner

EVALUATING READINESS LEVEL IN INDUSTRIAL FLOOR INFRASTRUCTURE AND AUTOMATION SOFTWARE

TECHNICAL FIELD

The present disclosure relates generally to industrial floor infrastructure, and more particularly to evaluating the readiness level in industrial floor infrastructure and automation software.

BACKGROUND

An industrial floor infrastructure refers to the machines, devices, robots, etc. that are utilized on an industrial floor (floor, such as concrete, used in industrial and commercial settings) to manufacture and produce parts, goods, pieces, etc., such as in a plant, factory, etc. For example, such machines may correspond to robots that weld and assemble parts. In another example, computer numerical control machines cut metal pieces to precise specification. In a further example, engine machining stations are used to create engine blocks.

SUMMARY

In one embodiment of the present disclosure, a computer-implemented method for readiness validation of industrial floor infrastructure and automation software comprises creating a digital twin simulation of the industrial floor infrastructure utilizing the automation software with an update. The method further comprises executing the digital twin simulation to analyze capabilities of the industrial floor infrastructure in view of the update to the automation software to identify capabilities of the updated automation software that are utilized with existing capabilities of the industrial floor infrastructure. The method additionally comprises providing, based on the digital twin simulation, one or more recommendations to upgrade, replace, install and/or perform proactive maintenance of the industrial floor infrastructure to further utilize capabilities of the updated automation software.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
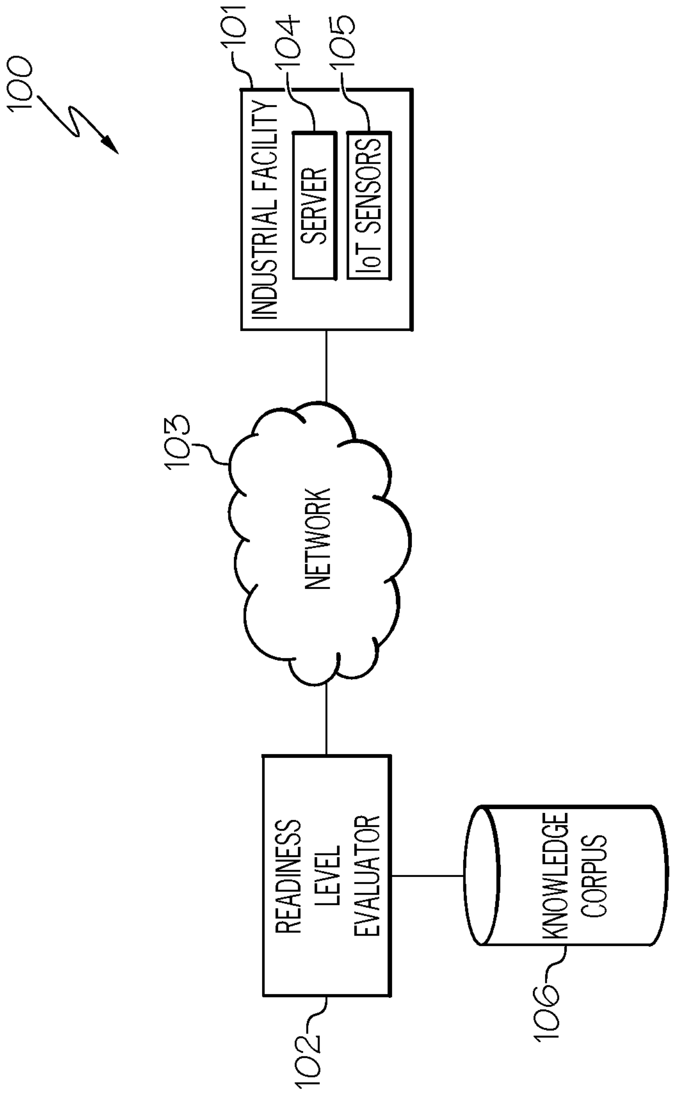
FIG. 1 illustrates an embodiment of the present disclosure of a communication system for practicing the principles of the present disclosure.

As stated above, an industrial floor infrastructure refers to the machines, devices, robots, etc. that are utilized on an industrial floor (floor, such as concrete, used in industrial and commercial settings) to manufacture and produce parts, goods, pieces, etc., such as in a plant, factory, etc. For example, such machines may correspond to robots that weld and assemble parts. In another example, computer numerical control machines cut metal pieces to precise specification. In a further example, engine machining stations are used to create engine blocks.

Such industrial floor infrastructure (e.g., machines, devices, robots, etc.) requires software (referred to herein as "automation software") to control such industrial floor infrastructure. Automation software are applications that minimize the need for human input and are designed to turn repeatable, routine tasks into automated actions.

Different versions of automation software possess different capabilities in automating industrial floor infrastructure. Similarly, industrial floor infrastructure (e.g., machines, devices, robots, etc.) have different capabilities requiring automation software with different features to control such capabilities. For example, different versions of automation software may control different capabilities (e.g., cutting, painting, assembling, welding, etc.) of the various machines, devices, robots, etc. of the industrial floor infrastructure. In another example, different machines, devices, robots, etc. of the industrial floor infrastructure require the appropriate automation software to be installed in order to correctly control all the capabilities of the industrial floor infrastructure. Hence, the capabilities of the industrial floor infrastructure need to be able to be controlled by the features of the automation software and the capabilities of the automation software need to be fully utilized to control the industrial floor infrastructure. As a result, there needs to be a readiness validation (assessing the state of the industrial floor infrastructure to be prepared to utilize the automation software and assessing the state of the automation software to be prepared to control the industrial floor infrastructure) for both the industrial floor infrastructure and the automation software so that the appropriate automation software is being utilized to control the appropriate industrial floor infrastructure.

For example, the automation software and industrial floor infrastructure should have the same level of readiness with respect to each other so that the capabilities of the industrial floor infrastructure to the greatest extent are controlled by the automation software and the capabilities of the automation software to the greatest extent are utilized to control the industrial floor infrastructure. For instance, if the industrial floor infrastructure does not possess the capabilities that the automation software is programed to control, then such automation software should not be installed in the industrial facility. Similarly, if the industrial floor infrastructure possesses capabilities that the automation software is not programed to control, then such automation software should not be installed in the industrial facility.

Unfortunately, there is not currently a means for evaluating the readiness level in the industrial floor infrastructure and automation software to ensure that the appropriate automation software is being utilized to control the appropriate industrial floor infrastructure.

The embodiments of the present disclosure provide a means for evaluating the readiness level in the industrial floor infrastructure and automation software to ensure that the appropriate automation software is being utilized to control the appropriate industrial floor infrastructure. In one embodiment, a digital twin simulation is created and executed to analyze the capabilities of the industrial floor infrastructure in view of an update to the automation software to identify capabilities of the updated automation software that are utilized by the existing capabilities of the industrial floor infrastructure. Recommendations may then be provided to upgrade, replace, install and/or perform proactive maintenance of the industrial floor infrastructure to further utilize the capabilities of the updated automation software if the capabilities of the updated automation software are not being utilized with the existing capabilities of the industrial floor infrastructure at an acceptable level. Furthermore, in one embodiment, a digital twin simulation is created and executed to analyze the capabilities of the industrial floor infrastructure with upgraded capabilities (after upgrading, replacing, installing and/or performing proactive maintenance of the industrial floor infrastructure) in view of the update to the automation software to identify capabilities of the industrial floor infrastructure with upgraded capabilities that are utilized by the updated automation software. Recommendations may then be provided to further update, upgrade or replace the updated automation software if the capabilities of the industrial floor infrastructure with upgraded capabilities are not being utilized by the automation software, including with the update, at an acceptable level. Such a process of evaluating the readiness level of both the industrial floor infrastructure and the automation software continues until the capabilities of the industrial floor infrastructure being utilized by the automation software and vice-versa are at an acceptable level thereby ensuring that the appropriate automation software is being utilized to control the appropriate industrial floor infrastructure. In this manner, the readiness level in the industrial floor infrastructure and automation software are evaluated to ensure that the appropriate automation software is being utilized to control the appropriate industrial floor infrastructure. A further discussion regarding these and other features is provided below.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes an industrial facility 101 connected to a readiness level evaluator 102 via a network 103.

An "industrial facility" 101, as used herein, refers to a complex (e.g., manufacturing plant) which may consist of one or more buildings that include an industrial floor infrastructure. An industrial floor infrastructure, as used herein, refers to the machines, devices, robots, etc. that operate on the industrial floor (floor, such as concrete, used in industrial and commercial settings, such as a plant) of industrial facility 101 to manufacture and produce parts, goods, pieces, etc. For example, such an industrial floor infrastructure may include robots that weld and assemble parts. In another example, such an industrial floor infrastructure may include computer numerical control machines to cut metal pieces to a precise specification. In a further example, such an industrial floor infrastructure may include engine machining stations used to create engine blocks.

In the illustration of FIG. 1, the interconnection of industrial facility 101 to readiness level evaluator 102 via network 103 is accomplished via a server 104.

In one embodiment, server 104 stores data regarding the capabilities of the industrial floor infrastructure and the automation software used to control such industrial floor infrastructure. "Automation software," as used herein, refers to applications that minimize the need for human input and are designed to turn repeatable, routine tasks into automated actions. For example, server 104 stores data regarding the capabilities of the industrial floor infrastructure (e.g., machines, devices, robots, etc.) being utilized in industrial facility 101, such as loading and unloading parts, material handling, transferring finished parts to post-processing, drilling, welding, painting, product inspection, picking and placing, die casting, glass making, grinding, etc. In one embodiment, such capabilities are stored for each particular machine, device, robot, etc. of the industrial floor infrastructure, such as in a data structure (e.g., table), which is stored in a storage device of server 104. Furthermore, server 104 stores data regarding the capabilities of the automation software, such as the manipulation of objects (e.g., panel) or tools (e.g., moving welding equipment along multiple axes), operations (e.g., motion control, positioning control, torque control, etc.), etc. In one embodiment, such capabilities are stored for each particular automation software being utilized, including for each version or update for such automation software, such as in a data structure (e.g., table), which is stored in a storage device of server 104.

In one embodiment, the data regarding the capabilities of the industrial floor infrastructure and the automation software used to control such industrial floor infrastructure is obtained and stored by server 104 from crowdsourced industries, where such information is obtained from a large group of people via the Internet, social media, smartphone applications, etc.

In one embodiment, the data regarding the capabilities of the industrial floor infrastructure and the automation software used to control such industrial floor infrastructure is obtained and stored by server 104 from Internet of Things (IoT) sensors 105. IoT sensor 105, as used herein, refers to a sensor that can be attached to a machine, device, robot, etc. of the industrial floor infrastructure. Furthermore, IoT sensors 105 are configured to exchange data with other devices and systems over a network, such as network 103. In one embodiment, IoT sensors 105 are configured to monitor the industrial floor infrastructure (e.g., machines, devices, robots, etc.) at industrial facility 101. For example, IoT sensors 105 may monitor the capabilities of the machines, devices, robots, etc. (industrial floor infrastructure), such as loading and unloading parts, material handling, transferring finished parts to post-processing, drilling, welding, painting, product inspection, picking and placing, die casting, glass making, grinding, etc. Such data may then be captured by IoT sensors 105 and relayed to server 104 to be stored, such as in a storage device of server 104.

In one embodiment, such data regarding the capabilities of the industrial floor infrastructure and the automation software used to control such industrial floor infrastructure is transmitted from industrial facility 101 to readiness level evaluator 102 via network 103.

In one embodiment, readiness level evaluator 102 is configured to evaluate the readiness level of the industrial floor infrastructure and automation software to ensure that the appropriate automation software is being utilized to control the appropriate industrial floor infrastructure. In one embodiment, readiness level evaluator 102 receives information regarding an update to a particular type of automation software being utilized by industrial facility 101 from server 104. The update (or patch) can comprise one or more changes to the automation software that fixes errors (bugs), fixes security vulnerabilities, provides new features, improves performance and/or usability of the automation software, etc. As an example, the update may change the motion, positioning and torque control capabilities of the automation software. Such information may be provided to readiness level evaluator 102 from server 104 in response to the release of the new software version.

In one embodiment, readiness level evaluator 102 creates and executes a digital twin simulation to analyze the capabilities of the industrial floor infrastructure, which is received from server 104, in view of the update to the automation software to identify capabilities of the updated automation software that are utilized by the existing capabilities of the industrial floor infrastructure. Recommendations may then be provided to upgrade, replace, install and/or perform proactive maintenance of the industrial floor infrastructure to further utilize capabilities of the updated automation software if the capabilities of the updated automation software are not being utilized with the existing capabilities of the industrial floor infrastructure at an acceptable level. In one embodiment, such recommendations are based on a knowledge corpus stored in a database 106 connected to readiness level evaluator 102. A "knowledge corpus," as used herein, refers to a collection of data that contains information pertaining to particular types and versions of automation software that were successfully used to control various specified capabilities of specified industrial floor infrastructure (e.g., machines, devices, robots, etc.) and which specified capabilities of specified industrial floor infrastructure (e.g., machines, devices, robots, etc.) were successfully controlled by which types and versions of automation software. For example, such a knowledge corpus may indicate that the version of ABB® Arc Welding FlexTrainer by ABB® (arc welding automation software) was successfully used to control the movement of welding equipment along multiple axes performed by Fanuc® ARC Mate 0iA (example of an industrial floor infrastructure).

Furthermore, in one embodiment, readiness level evaluator 102 is configured to create and execute a digital twin simulation to analyze the capabilities of the industrial floor infrastructure with upgraded capabilities (after upgrading, replacing, installing and/or performing proactive maintenance of the industrial floor infrastructure) in view of the update to the automation software to identify capabilities of the industrial floor infrastructure with upgraded capabilities that are utilized by the updated automation software. Recommendations may then be provided to further update, upgrade or replace the automation software if the capabilities of the industrial floor infrastructure with upgraded capabilities are not being utilized by the automation software, including with the update, at an acceptable level. In one embodiment, such recommendations are based on a knowledge corpus stored in database 106 connected to readiness level evaluator 102.

Such a process of evaluating the readiness level of both the industrial floor infrastructure and the automation software continues until the capabilities of the industrial floor infrastructure being utilized by the automation software and vice-versa are at an acceptable level thereby ensuring that the appropriate automation software is being utilized to control the appropriate industrial floor infrastructure. A further discussion regarding these and other features is provided below.

A description of the software components of readiness level evaluator 102 used for evaluating the readiness level of the industrial floor infrastructure and automation software to ensure that the appropriate automation software is being utilized to control the appropriate industrial floor infrastructure is provided below in connection with FIG. 2. A description of the hardware configuration of readiness level evaluator 102 is provided further below in connection with FIG. 3.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 is not to be limited in scope to any one particular network architecture. System 100 may include any number of industrial facilities 101, readiness level evaluators 102, networks 103, servers 104, IoT sensors 105 and databases 106.

A discussion regarding the software components used by readiness level evaluator 102 for evaluating the readiness level of the industrial floor infrastructure and automation software is provided below in connection with FIG. 2

Figure 2:
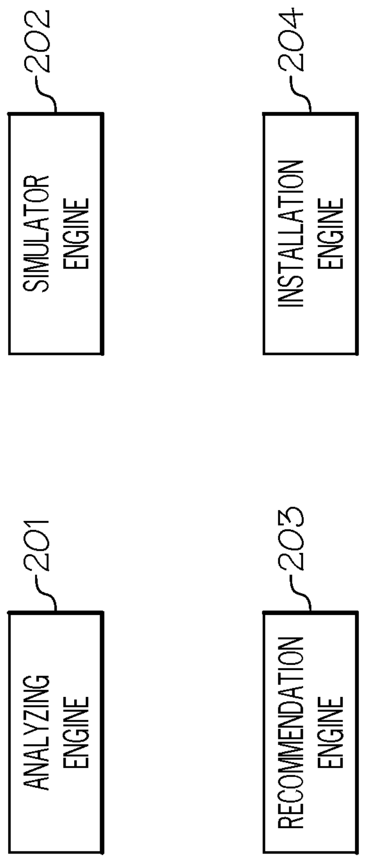
FIG. 2 is a diagram of the software components used by the readiness level evaluator for evaluating the readiness level of the industrial floor infrastructure and automation software to ensure that the appropriate automation software is being utilized to control the appropriate industrial floor infrastructure in accordance with an embodiment of the present disclosure.

FIG. 2 is a diagram of the software components used by readiness level evaluator 102 for evaluating the readiness level of the industrial floor infrastructure and automation software to ensure that the appropriate automation software is being utilized to control the appropriate industrial floor infrastructure in accordance with an embodiment of the present disclosure.

Referring to FIG. 2, in conjunction with FIG. 1, readiness level evaluator 102 includes analyzing engine 201 configured to determine if there is a match between the capabilities of the automation software and the capabilities of the industrial floor infrastructure for which the automation software is to control.

In one embodiment, analyzing engine 201 receives information regarding an update to the automation software from server 104, such as an update to the motion, positioning and torque control capabilities of the automation software. In one embodiment, such information regarding the update to the automation software may first be provided to server 104 from the software company that updated the automation software. In another embodiment, such information regarding the update to the automation software may first be provided to server 104 from crowdsourcing (information is obtained from a large group of people via the Internet, social media, smartphone applications, etc.). Such information may then be provided to analyzing engine 201 from server 104 in response to the release of the new software version.

In one embodiment, such information includes the capabilities of the new software version, such as motion, positioning and torque control operations.

In one embodiment, analyzing engine 201 is configured to determine if the capabilities of the updated automation software are being utilized by the existing industrial floor infrastructure (e.g., machines, devices, robots, etc.). In one embodiment, analyzing engine 201 makes such a determination by simulator engine 202 performing a digital twin simulation. A "digital twin," as used herein, is a virtual representation of a real-world physical asset of a system, such as the industrial floor infrastructure (e.g., machines, devices, robots, etc.) in industrial facility 101, which is continuously updated. A "digital twin simulation," as used herein, is a simulation of the virtual representation of a real-world physical asset of a system, such as the industrial floor infrastructure (e.g., machines, devices, robots, etc.) in industrial facility 101, which is continuously updated.

In one embodiment, simulator engine 202 is configured to create a digital twin simulation of the industrial floor infrastructure utilizing the automation software with the update. In one embodiment, such a digital twin simulation includes a virtual representation of the real-world industrial floor infrastructure, including its capabilities, which is obtained from server 104. As previously discussed, server 104 stores data regarding the capabilities of the industrial floor infrastructure. For example, server 104 stores data regarding the capabilities of the industrial floor infrastructure (e.g., machines, devices, robots, etc.) being utilized in industrial facility 101, such as loading and unloading parts, material handling, transferring finished parts to post-processing, drilling, welding, painting, product inspection, picking and placing, die casting, glass making, grinding, etc. In one embodiment, such capabilities are stored for each particular machine, device, robot, etc. of the industrial floor infrastructure, such as in a data structure (e.g., table), which is stored in a storage device of server 104.

As discussed above, simulator engine 202 creates a digital twin simulation of the industrial floor infrastructure utilizing the capabilities of the updated automation software. In one embodiment, such capabilities may be provided from analyzing engine 201, which receives such information regarding an update to the automation software from server 104, such as an update to the motion, positioning and torque control capabilities of the automation software. Such capabilities may then be applied to a digital copy (discussed further below).

Furthermore, as previously discussed, server 104 stores data regarding the capabilities of the automation software, such as the manipulation of objects (e.g., panel) or tools (e.g., moving welding equipment along multiple axes), operations (e.g., motion control, positioning control, torque control, etc.), etc. In one embodiment, such capabilities are stored for each particular automation software being utilized, including for each version or update for such automation software, such as in a data structure (e.g., table), which is stored in a storage device of server 104. In one embodiment, such capabilities of the automation software, including updates, are provided to analyzing engine 201 and/or simulator engine 202 by server 104. Such capabilities may then be applied to a digital copy (discussed further below).

In one embodiment, simulator engine 202 creates a digital twin simulation of the industrial floor infrastructure (including with upgraded capabilities) utilizing the automation software (including with updates) based on data received from sensors (e.g., IoT sensors 105) related to vital areas of functionality and capability of the industrial floor infrastructure. Such sensors 105 produce data about the different aspects of the performance of the industrial floor infrastructure (e.g., machines, devices, robots, etc.) and/or automation software used to control such industrial floor infrastructure. Such data is then relayed to simulator engine 202 and applied to a digital copy. A "digital copy," as used herein, refers to a virtual copy of the physical asset, process, system and/or environment that looks like and behaves identical to its real-world counterpart. In the embodiment of the present disclosure, such a digital copy corresponds to a virtual copy of the industrial floor infrastructure and automation software, such as used in industrial facility 101.

In one embodiment, once informed with such data, simulator engine 202 creates a virtual model used to run simulations to identify capabilities of the automation software, including updates to the automation software, that are being utilized with the existing capabilities of the industrial floor infrastructure. Furthermore, simulator engine 202 uses such data to create a virtual model used to run simulations to identify capabilities of the industrial floor infrastructure, including with upgraded capabilities, that are being utilized by the automation software, including any updates to the automated software.

In one embodiment, simulator engine 202 executes the created digital twin simulation discussed above to analyze the capabilities of the industrial floor infrastructure in view of the update to the automation software to identify capabilities of the updated automation software that are utilized by the existing capabilities of the industrial floor infrastructure. Based on such a simulation, analyzing engine 201 determines if the industrial floor infrastructure has the readiness level for utilizing the capabilities of the updated automation software as discussed further below.

In one embodiment, simulator engine 202 executes the created digital twin simulation discussed above to analyze the capabilities of the industrial floor infrastructure with upgraded capabilities in view of the automation software, including updates, to identify capabilities of the industrial floor infrastructure with upgraded capabilities that are utilized by the automation software, including updated automation software. Based on such a simulation, analyzing engine 201 determines if the automation software, including the updated automation software, has the readiness level for utilizing the capabilities of the industrial floor infrastructure with upgraded capabilities as discussed further below.

In one embodiment, simulator engine 202 utilizes various software tools for creating and executing such a digital twin simulation, including, but not limited to, Vention®, aPriori® Digital Manufacturing Simulation Software, Autodesk® Digital Twin, XMPro®, Predix®, Mimic® Simulation, Ansys® Twin Builder, 7bridges, Akka®, etc.

As discussed above, analyzing engine 201 is configured to determine if there is a match between the capabilities of the automation software and the capabilities of the industrial floor infrastructure for which the automation software is to control. In one embodiment, such an analysis performed by analyzing engine 201 is based on the digital twin simulations discussed above.

In one embodiment, based on the digital twin simulation executed to analyze the capabilities of the industrial floor infrastructure in view of the update to the automation software to identify capabilities of the updated automation software that are utilized by the existing capabilities of the industrial floor infrastructure, analyzing engine 201 determines the percentage of capabilities of the updated automation software that are being utilized by the existing industrial floor infrastructure.

For example, in one embodiment, the capabilities of the updated automation software may be provided to analyzing engine 201 from server 104 and/or simulation engine 202. In one embodiment, such capabilities are tabulated to form a list of capabilities, such as the various motion, position and torque control operations (e.g., move left arm of robot upwards at 45° followed by moving right arm of robot inward by 3 inches), which is stored in a storage device of readiness level evaluator 102.

Based on the analysis of the digital twin simulation, analyzing engine 201 determines which of the capabilities in the list of capabilities of the automation software, including the updated automation software, are being utilized by the existing industrial floor infrastructure (e.g., machines, devices, robots, etc.).

In one embodiment, analyzing engine 201 utilizes various software tools for analyzing the digital twin simulation to determine which of the capabilities of the automation software, including the updated automation software, are being utilized by the existing industrial floor infrastructure, including, but not limited to, aPriori® Digital Manufacturing Simulation Software, Autodesk® Digital Twin, XMPro®, Predix®, Mimic® Simulation, Ansys® Twin Builder, 7bridges, Akka®, etc.

In one embodiment, analyzing engine 201 stores the result of the analysis in the knowledge corpus, which resides in database 106. As previously discussed, a "knowledge corpus," as used herein, refers to a collection of data that contains information pertaining to particular types and versions of automation software that were successfully used to control various specified capabilities of specified industrial floor infrastructure (e.g., machines, devices, robots, etc.) and which specified capabilities of specified industrial floor infrastructure (e.g., machines, devices, robots, etc.) were successfully controlled by which types and versions of automation software. For example, such a knowledge corpus may indicate that version #2 of ABB® Arc Welding FlexTrainer by ABB® (arc welding automation software) was successfully used to control the movement of welding equipment along multiple axes performed by Fanuc® ARC Mate 0iA (example of an industrial floor infrastructure).

In one embodiment, based on the digital twin simulation executed to analyze the capabilities of the industrial floor infrastructure with upgraded capabilities in view of the automation software, including with updates, to identify capabilities of the industrial floor infrastructure with upgraded capabilities that are utilized by the automation software, including the updated automation software, analyzing engine 201 determines the percentage of capabilities of the industrial floor infrastructure with the upgraded capabilities that are being utilized by the automation software, including the updated automation software.

For example, in one embodiment, the capabilities of the industrial floor infrastructure may be provided to analyzing engine 201 from server 104 and/or simulation engine 202. In one embodiment, such capabilities are tabulated to form a list of capabilities for each particular machine, device, robot, etc. of the industrial floor infrastructure, such as loading and unloading parts, material handling, transferring finished parts to post-processing, drilling, welding, painting, product inspection, picking and placing, die casting, glass making, grinding, etc., which is stored in a storage device of readiness level evaluator 102.

Based on the analysis of the digital twin simulation, analyzing engine 201 determines which of the capabilities in the list of capabilities of the industrial floor infrastructure with upgraded capabilities are being utilized by the automation software, including the updated automation software.

In one embodiment, analyzing engine 201 utilizes various software tools for analyzing the digital twin simulation to determine which of the capabilities of the industrial floor infrastructure with upgraded capabilities are being utilized by the automation software, including the updated automation software, including, but not limited to, aPriori® Digital Manufacturing Simulation Software, Autodesk® Digital Twin, XMPro®, Predix®, Mimic® Simulation, Ansys® Twin Builder, 7bridges, Akka®, etc.

In one embodiment, analyzing engine 201 stores the result of the analysis in the knowledge corpus, which resides in database 106.

Readiness level evaluator 102 further includes a recommendation engine 203 configured to provide a recommendation(s) to address situations in which the percentage of capabilities of the updated automation software that are being utilized by the existing industrial floor infrastructure does not exceed a threshold value, which may be user-specified. Furthermore, in one embodiment, recommendation engine 203 provides a recommendation(s) to address situations in which the percentage of capabilities of the industrial floor infrastructure with the upgraded capabilities that are being utilized by the automation software, including the updated automation software, does not exceed a threshold value, which may be user-specified.

In one embodiment, in the situation in which the percentage of capabilities of the updated automation software that are being utilized by the existing industrial floor infrastructure does not exceed a threshold value, recommendation engine 203 is configured to provide a recommendation(s) to upgrade, replace, install and/or perform proactive maintenance of the industrial floor infrastructure to further utilize the capabilities of the updated automation software based on the knowledge corpus, which includes a collection of data that contains information pertaining to which specified capabilities of specified industrial floor infrastructure (e.g., machines, devices, robots, etc.) were successfully controlled by which types and versions of automation software. For example, the capability of the updated automation software (e.g., ABB® Arc Welding FlexTrainer by ABB®) pertaining to controlling welding equipment along multiple axes may not be utilized with the current industrial floor infrastructure since the current industrial floor infrastructure utilizes the welding equipment of Kuka® KR Cybertech, which cannot perform such an operation using the updated automation software. As a result, recommendation engine 203 may analyze the knowledge corpus for equivalent welding equipment that can be controlled along multiple axes by the updated automation software (e.g., ABB® Arc Welding Flex Trainer by ABB®). Upon identifying the welding equipment of Fanuc® ARC Mate 0iA in the knowledge corpus as being able to be controlled by the updated automation software (e.g., ABB® Arc Welding FlexTrainer by ABB®), recommendation engine 203 provides a recommendation to replace the welding equipment of Kuka® KR Cybertech with the welding equipment of Fanuc® ARC Mate 0iA or to simply install the welding equipment of Fanuc® ARC Mate 0iA to be added to the current industrial floor infrastructure.

In one embodiment, in the situation in which the percentage of capabilities of the industrial floor infrastructure with the upgraded capabilities that are being utilized by the automation software, including the updated automation software, does not exceed a threshold value, recommendation engine 203 is configured to provide a recommendation(s) to update, upgrade or replace the automation software (e.g., updating the version of the automation software, entirely replacing the automation software with an alternative automation software) based on the knowledge corpus, which includes a collection of data that contains information pertaining to particular types and versions of automation software that were successfully used to control various specified capabilities of specified industrial floor infrastructure (e.g., machines, devices, robots, etc.). For example, the capability of controlling the welding equipment of Fanuc® ARC Mate 0iB along multiple axes was not utilized by the updated automation software (e.g., version 3 of ABB® Arc Welding FlexTrainer by ABB®). As a result, recommendation engine 203 may analyze the knowledge corpus for automation software with the capability of controlling the welding equipment of Fanuc® ARC Mate 0iB along multiple axes. In such a knowledge corpus, it may indicate that version 4 of ABB® Arc Welding FlexTrainer by ABB® has the capability of controlling the welding equipment of Fanuc® ARC Mate 0iB along multiple axes. As a result, recommendation engine 203 recommends to update the automation software by updating the version of the automation software (e.g., use version 4 of ABB® Arc Welding FlexTrainer as opposed to version 3 of ABB® Arc Welding FlexTrainer).

In one embodiment, recommendation engine 203 utilizes the k-nearest neighbors algorithm to provide such recommendations using the knowledge corpus. In one embodiment, the k-nearest neighbors algorithm works by finding the k nearest neighbors of a given item (e.g., capability of industrial floor infrastructure, capability of automation software). The neighbors are then used to vote on the rating of the item. The algorithm then uses the average of the votes to predict the rating of the item.

In one embodiment, recommendation engine 203 provides such recommendations using the knowledge corpus by recommendation engine 203 using a machine learning algorithm to build and train a model (machine learning model) to identify the recommendation to address the situations discussed above (the percentage of capabilities of the updated automation software that are being utilized by the existing industrial floor infrastructure does not exceed a threshold value, the percentage of capabilities of the industrial floor infrastructure with the upgraded capabilities that are being utilized by the automation software, including the updated automation software, does not exceed a threshold value) using a sample data set that includes capabilities of the industrial floor infrastructure and the capabilities of automation software. In one embodiment, such a sample data set is compiled by an expert.

Furthermore, such a sample data set is referred to herein as the "training data," which is used by the machine learning algorithm to make predictions or decisions as to the appropriate recommendation to be provided to address the situations discussed above based on the training data. The algorithm iteratively makes predictions of the appropriate recommendations to address the situations discussed above until the predictions achieve the desired accuracy as determined by an expert. Examples of such learning algorithms include nearest neighbor, Naïve Bayes, decision trees, linear regression, support vector machines and neural networks.

In one embodiment, such a recommendation(s), as discussed above, are issued to the user of readiness level evaluator 102, such as by displaying such a recommendation(s) to the user of readiness level evaluator 102 on the graphical user interface of readiness level evaluator 102.

Upon the display of the recommendation, the user may accept such a recommendation, such as by selecting an acceptance option displayed to the user on the graphical user interface of readiness level evaluator 102. The user may then proceed to implement such a recommendation, such as upgrading, replacing, installing and/or performing proactive maintenance of the industrial floor infrastructure or updating, upgrading or replacing the automation software (e.g., updating the version of the automation software, replacing the automation software with an alternative automation software). Upon upgrading, replacing, installing and/or performing proactive maintenance of the industrial floor infrastructure, the industrial floor infrastructure may be said to include "upgraded capabilities."

Furthermore, readiness level evaluator 102 includes an installation engine 204 configured to install the automation software in question in industrial facility 101 when the capabilities of the industrial floor infrastructure being utilized by the automation software and vice-versa are at an acceptable level thereby ensuring that the appropriate automation software is being utilized to control the appropriate industrial floor infrastructure. That is, installation engine 204 installs the automation software in question in industrial facility 101 when both the industrial floor infrastructure and the automation software are at the appropriate readiness level.

In one embodiment, the capabilities of the industrial floor infrastructure being utilized by the automation software and vice-versa are deemed to be at an acceptable level when the percentage of capabilities of the updated automation software that are being utilized by the existing industrial floor infrastructure exceeds a threshold value or when the percentage of capabilities of the industrial floor infrastructure with the upgraded capabilities that are being utilized by the automation software, including the updated automation software, exceeds a threshold value.

In one embodiment, installation engine 204 installs the automation software, such as the updated automated software, in industrial facility 101 using various software tools, including, but not limited to, Atera®, Atlassian Bamboo, Jenkins®, TeamCity®, ElectricFlow®, etc.

A further description of these and other features is provided below in connection with the discussion of the method for evaluating the readiness level in the industrial floor infrastructure and automation software.

Prior to the discussion of the method for evaluating the readiness level in the industrial floor infrastructure and automation software, a description of the hardware configuration of readiness level evaluator 102 (FIG. 1) is provided below in connection with FIG. 3.

Figure 3:
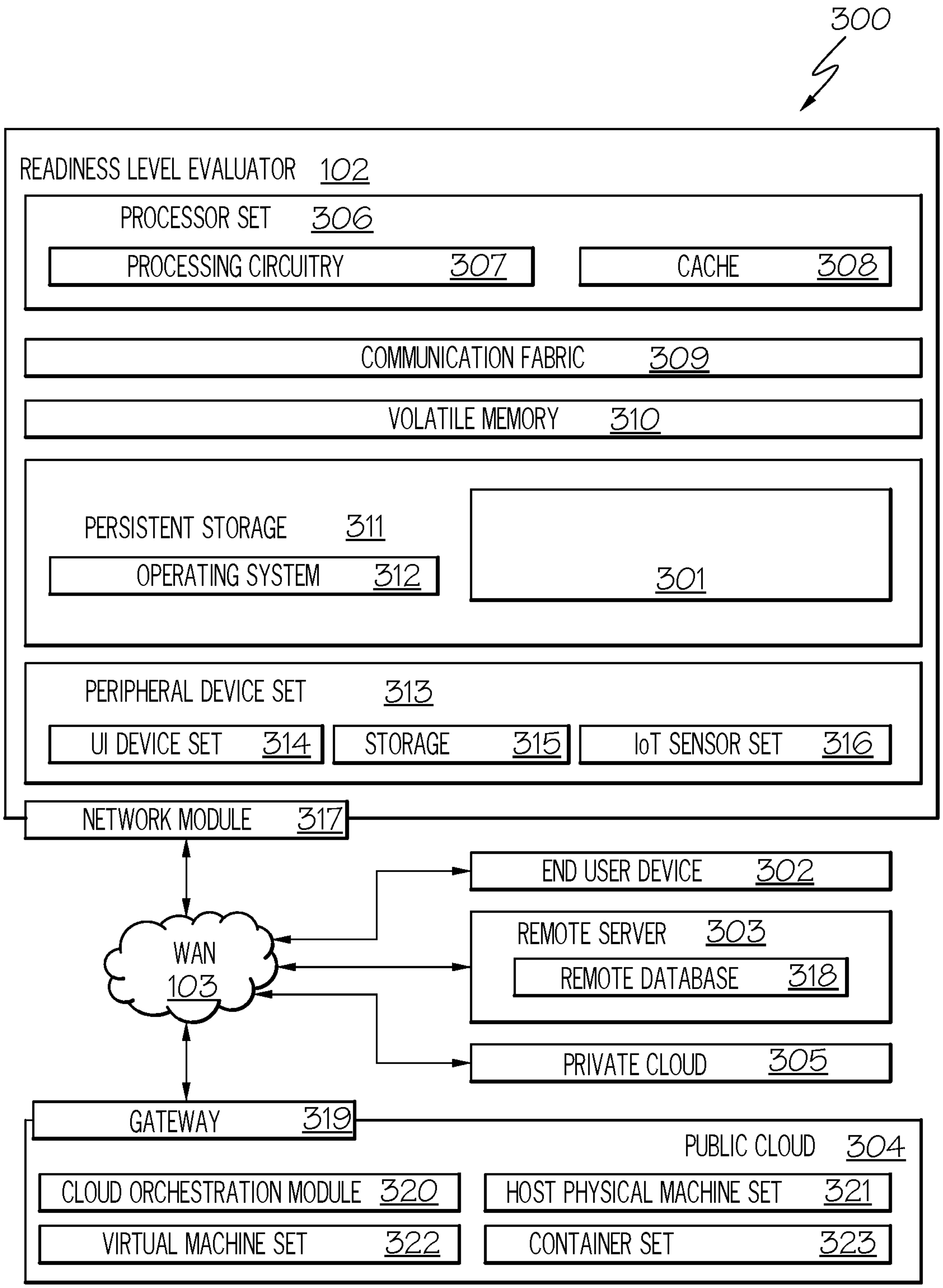
FIG. 3 illustrates an embodiment of the present disclosure of the hardware configuration of the readiness level evaluator which is representative of a hardware environment for practicing the present disclosure.

Referring now to FIG. 3, in conjunction with FIG. 1, FIG. 3 illustrates an embodiment of the present disclosure of the hardware configuration of readiness level evaluator 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (computer code for evaluating the readiness level in the industrial floor infrastructure and automation software, which is stored in block 301) involved in performing the disclosed methods, such as evaluating the readiness level in the industrial floor infrastructure and automation software. In addition to block 301, computing environment 300 includes, for example, readiness level evaluator 102, network 103, such as a wide area network (WAN), end user device (EUD) 302, remote server 303, public cloud 304, and private cloud 305. In this embodiment, readiness level evaluator 102 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Readiness level evaluator 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically readiness level evaluator 102, to keep the presentation as simple as possible. Readiness level evaluator 102 may be located in a cloud, even though it is not shown in a cloud in FIG. 3. On the other hand, readiness level evaluator 102 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto readiness level evaluator 102 to cause a series of operational steps to be performed by processor set 306 of readiness level evaluator 102 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 308 and the other storage media discussed below. The program instructions, and associated data, are accessed by processor set 306 to control and direct performance of the disclosed methods. In computing environment 300, at least some of the instructions for performing the disclosed methods may be stored in block 301 in persistent storage 311.

Communication fabric 309 is the signal conduction paths that allow the various components of readiness level evaluator 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In readiness level evaluator 102, the volatile memory 310 is located in a single package and is internal to readiness level evaluator 102, but, alternatively or additionally, the volatile memory may be distributed over multiple packages and/or located externally with respect to readiness level evaluator 102.

Persistent Storage 311 is any form of non-volatile storage for computers that is now known or to be developed in the future. The non-volatility of this storage means that the stored data is maintained regardless of whether power is being supplied to readiness level evaluator 102 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the disclosed methods.

Peripheral device set 313 includes the set of peripheral devices of readiness level evaluator 102. Data communication connections between the peripheral devices and the other components of readiness level evaluator 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where readiness level evaluator 102 is required to have a large amount of storage (for example, where readiness level evaluator 102 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows readiness level evaluator 102 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the disclosed methods can typically be downloaded to readiness level evaluator 102 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates readiness level evaluator 102), and may take any of the forms discussed above in connection with readiness level evaluator 102. EUD 302 typically receives helpful and useful data from the operations of readiness level evaluator 102. For example, in a hypothetical case where readiness level evaluator 102 is designed to provide a recommendation to an end user, this recommendation would typically be communicated from network module 317 of readiness level evaluator 102 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to readiness level evaluator 102. Remote server 303 may be controlled and used by the same entity that operates readiness level evaluator 102. Remote server 303 represents the machine(s) that collect and store helpful and useful data for use by other computers, such as readiness level evaluator 102. For example, in a hypothetical case where readiness level evaluator 102 is designed and programmed to provide a recommendation based on historical data, then this historical data may be provided to readiness level evaluator 102 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 3 to evaluate the readiness level in the industrial floor infrastructure and automation software. In one embodiment, such components may be implemented in hardware. The functions discussed above performed by such components are not generic computer functions. As a result, readiness level evaluator 102 is a particular machine that is the result of implementing specific, non-generic computer functions.

In one embodiment, the functionality of such software components of readiness level evaluator 102, including the functionality for evaluating the readiness level in the industrial floor infrastructure and automation software, may be embodied in an application specific integrated circuit.

As stated above, industrial floor infrastructure (e.g., machines, devices, robots, etc.) requires software (referred to herein as "automation software") to control such industrial floor infrastructure. Automation software are applications that minimize the need for human input and are designed to turn repeatable, routine tasks into automated actions. Different versions of automation software possess different capabilities in automating industrial floor infrastructure. Similarly, industrial floor infrastructure (e.g., machines, devices, robots, etc.) have different capabilities requiring automation software with different features to control such capabilities. For example, different versions of automation software may control different capabilities (e.g., cutting, painting, assembling, welding, etc.) of the various machines, devices, robots, etc. of the industrial floor infrastructure. In another example, different machines, devices, robots, etc. of the industrial floor infrastructure require the appropriate automation software to be installed in order to correctly control all the capabilities of the industrial floor infrastructure. Hence, the capabilities of the industrial floor infrastructure need to be able to be controlled by the features of the automation software and the capabilities of the automation software need to be fully utilized to control the industrial floor infrastructure. As a result, there needs to be a readiness validation (assessing the state of the industrial floor infrastructure to be prepared to utilize the automation software and assessing the state of the automation software to be prepared to control the industrial floor infrastructure) for both the industrial floor infrastructure and the automation software so that the appropriate automation software is being utilized to control the appropriate industrial floor infrastructure. For example, the automation software and industrial floor infrastructure should have the same level of readiness with respect to each other so that the capabilities of the industrial floor infrastructure to the greatest extent are controlled by the automation software and the capabilities of the automation software to the greatest extent are utilized to control the industrial floor infrastructure. For instance, if the industrial floor infrastructure does not possess the capabilities that the automation software is programed to control, then such automation software should not be installed in the industrial facility. Similarly, if the industrial floor infrastructure possesses capabilities that the automation software is not programed to control, then such automation software should not be installed in the industrial facility. Unfortunately, there is not currently a means for evaluating the readiness level in the industrial floor infrastructure and automation software to ensure that the appropriate automation software is being utilized to control the appropriate industrial floor infrastructure.

The embodiments of the present disclosure provide a means for evaluating the readiness level in the industrial floor infrastructure and automation software to ensure that the appropriate automation software is being utilized to control the appropriate industrial floor infrastructure as discussed below in connection with FIGS. 4A-4B.

Figure 4A:
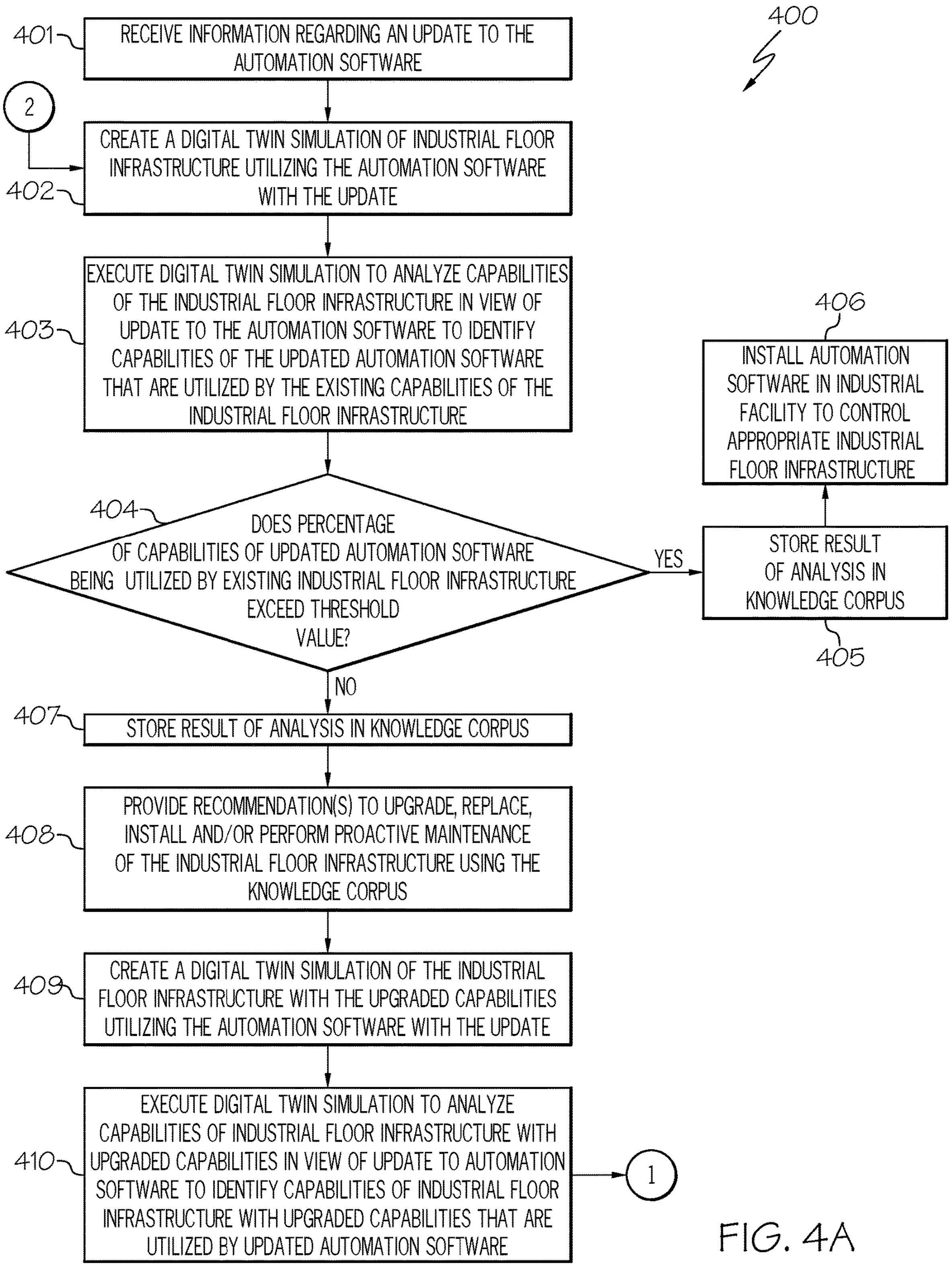
FIGS. 4A-4B are a flowchart of a method for evaluating the readiness level in the industrial floor infrastructure and automation software in accordance with an embodiment of the present disclosure.
Figure 4B:
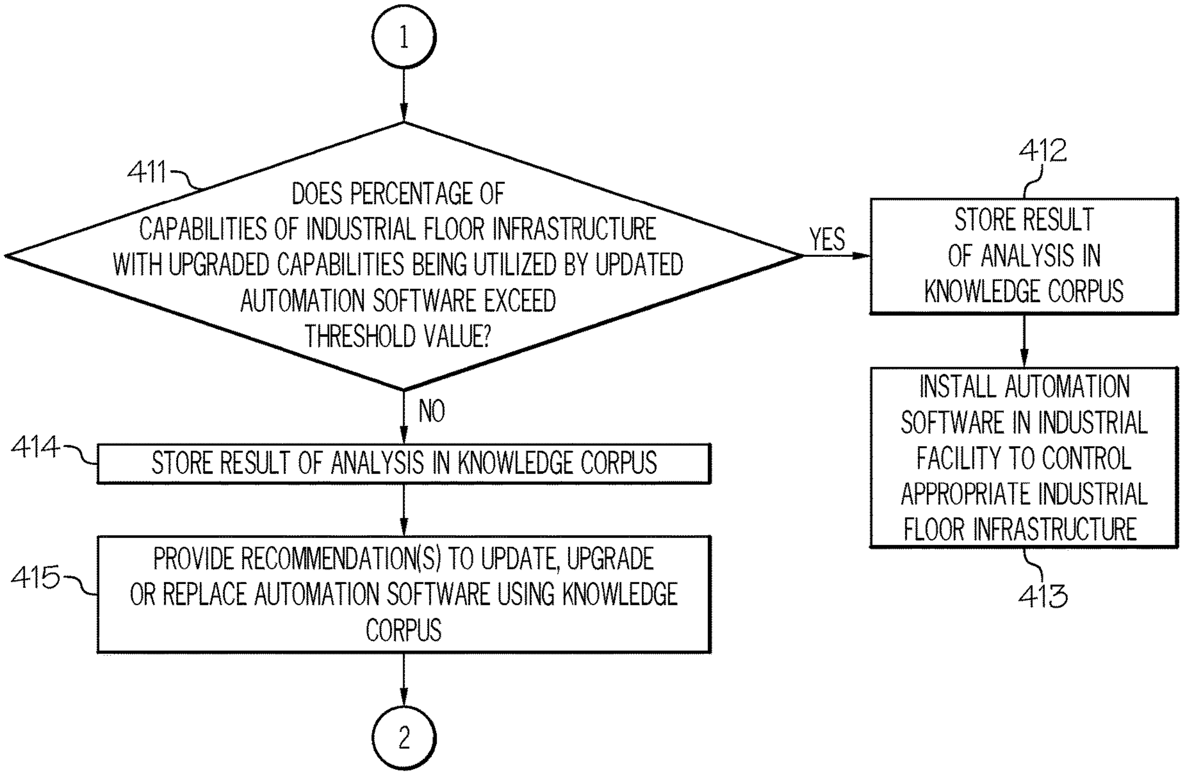

FIGS. 4A-4B are a flowchart of a method 400 for evaluating the readiness level in the industrial floor infrastructure and automation software in accordance with an embodiment of the present disclosure.

Referring to FIG. 4A, in conjunction with FIGS. 1-3, in operation 401, analyzing engine 201 of readiness level evaluator 102 receives information regarding an update to the automation software, such as from server 104. For example, such information may include details regarding an update to the motion, positioning and torque control capabilities of the automation software.

As discussed above, in one embodiment, such information regarding the update to the automation software may first be provided to server 104 from the software company that updated the automation software. In another embodiment, such information regarding the update to the automation software may first be provided to server 104 from crowdsourcing (information is obtained from a large group of people via the Internet, social media, smartphone applications, etc.). Such information may then be provided to analyzing engine 201 from server 104 in response to the release of the new software version.

In one embodiment, such information includes the capabilities of the new software version, such as motion, positioning and torque control operations.

In operation 402, simulator engine 202 of readiness level evaluator 102 creates a digital twin simulation of the industrial floor infrastructure utilizing the automation software with the update.

As stated above, a "digital twin," as used herein, is a virtual representation of a real-world physical asset of a system, such as the industrial floor infrastructure (e.g., machines, devices, robots, etc.) in industrial facility 101, which is continuously updated. A "digital twin simulation," as used herein, is a simulation of the virtual representation of a real-world physical asset of a system, such as the industrial floor infrastructure (e.g., machines, devices, robots, etc.) in industrial facility 101, which is continuously updated.

In one embodiment, simulator engine 202 is configured to create a digital twin simulation of the industrial floor infrastructure utilizing the automation software with the update. In one embodiment, such a created digital twin simulation includes a virtual representation of the real-world industrial floor infrastructure, including its capabilities, which is obtained from server 104. As previously discussed, server 104 stores data regarding the capabilities of the industrial floor infrastructure. For example, server 104 stores data regarding the capabilities of the industrial floor infrastructure (e.g., machines, devices, robots, etc.) being utilized in industrial facility 101, such as loading and unloading parts, material handling, transferring finished parts to post-processing, drilling, welding, painting, product inspection, picking and placing, die casting, glass making, grinding, etc. In one embodiment, such capabilities are stored for each particular machine, device, robot, etc. of the industrial floor infrastructure, such as in a data structure (e.g., table), which is stored in a storage device of server 104.

As discussed above, simulator engine 202 creates a digital twin simulation of the industrial floor infrastructure utilizing the capabilities of the updated automation software. In one embodiment, such capabilities may be provided from analyzing engine 201, which receives such information regarding an update to the automation software from server 104, such as an update to the motion, positioning and torque control capabilities of the automation software. Such capabilities may then be applied to a digital copy.

Furthermore, as previously discussed, server 104 stores data regarding the capabilities of the automation software, such as the manipulation of objects (e.g., panel) or tools (e.g., moving welding equipment along multiple axes), operations (e.g., motion control, positioning control, torque control, etc.), etc. In one embodiment, such capabilities are stored for each particular automation software being utilized, including for each version or update for such automation software, such as in a data structure (e.g., table), which is stored in a storage device of server 104. In one embodiment, such capabilities of the automation software, including updates, are provided to analyzing engine 201 and/or simulator engine 202 by server 104. Such capabilities may then be applied to a digital copy.

In one embodiment, simulator engine 202 creates a digital twin simulation of the industrial floor infrastructure (including with upgraded capabilities) utilizing the automation software (including with updates) based on data received from sensors (e.g., IoT sensors 105) related to vital areas of functionality and capability of the industrial floor infrastructure. Such sensors 105 produce data about the different aspects of the performance of the industrial floor infrastructure (e.g., machines, devices, robots, etc.) and/or automation software used to control such industrial floor infrastructure. Such data is then relayed to simulator engine 202 and applied to a digital copy. A "digital copy," as used herein, refers to a virtual copy of the physical asset, process, system and/or environment that looks like and behaves identical to its real-world counterpart. In the embodiment of the present disclosure, such a digital copy corresponds to a virtual copy of the industrial floor infrastructure and automation software, such as used in industrial facility 101.

In one embodiment, once informed with such data, simulator engine 202 creates a virtual model used to run simulations to identify capabilities of the automation software, including updates to the automation software, that are being utilized with the existing capabilities of the industrial floor infrastructure. In one embodiment, simulator engine 202 utilizes various software tools for creating such a digital twin simulation, including, but not limited to, Vention®, aPriori® Digital Manufacturing Simulation Software, Autodesk® Digital Twin, XMPro®, Predix®, Mimic® Simulation, Ansys® Twin Builder, 7bridges, Akka®, etc.

In operation 403, simulator engine 202 of readiness level evaluator 102 executes the created digital twin simulation to analyze the capabilities of the industrial floor infrastructure in view of the update to the automation software to identify capabilities of the updated automation software that are utilized by the existing capabilities of the industrial floor infrastructure.

In one embodiment, simulator engine 202 utilizes various software tools for executing such a digital twin simulation, including, but not limited to, Vention®, aPriori® Digital Manufacturing Simulation Software, Autodesk® Digital Twin, XMPro®, Predix®, Mimic® Simulation, Ansys® Twin Builder, 7bridges, Akka®, etc.

In operation 404, analyzing engine 201 of readiness level evaluator 102 determines if the industrial floor infrastructure has the readiness level for utilizing the capabilities of the updated automation software. In particular, analyzing engine 201 determines whether the percentage of capabilities of the updated automation software that are being utilized by the existing industrial floor infrastructure exceeds a threshold value, which may be user-selected.

For example, in one embodiment, the capabilities of the updated automation software may be provided to analyzing engine 201 from server 104 and/or simulation engine 202. In one embodiment, such capabilities are tabulated to form a list of capabilities, such as the various motion, position and torque control operations (e.g., move left arm of robot upwards at 45° followed by moving right arm of robot inward by 3 inches), which is stored in a storage device (e.g., storage device 311, 315) of readiness level evaluator 102.

Based on the analysis of the digital twin simulation, analyzing engine 201 determines which of the capabilities in the list of capabilities of the automation software, including the updated automation software, are being utilized by the existing industrial floor infrastructure (e.g., machines, devices, robots, etc.).

In one embodiment, analyzing engine 201 utilizes various software tools for analyzing the digital twin simulation to determines which of the capabilities of the automation software, including the updated automation software, are being utilized by the existing industrial floor infrastructure, including, but not limited to, aPriori® Digital Manufacturing Simulation Software, Autodesk® Digital Twin, XMPro®, Predix®, Mimic® Simulation, Ansys® Twin Builder, 7bridges, Akka®, etc.

If the percentage of capabilities of the updated automation software that are being utilized by the existing industrial floor infrastructure exceeds a threshold value thereby indicating that the capabilities of the industrial floor infrastructure being utilized by the automation software and vice-versa are at an acceptable level, then, in operation 405, analyzing engine 201 of readiness level evaluator 102 stores the result of the analysis in the knowledge corpus, which resides in database 106. Such knowledge will be used by recommendation engine 203 to provide the appropriate recommendation(s).

As previously discussed, a "knowledge corpus," as used herein, refers to a collection of data that contains information pertaining to particular types and versions of automation software that were successfully used to control various specified capabilities of specified industrial floor infrastructure (e.g., machines, devices, robots, etc.) and which specified capabilities of specified industrial floor infrastructure (e.g., machines, devices, robots, etc.) were successfully controlled by which types and versions of automation software.

In operation 406, installation engine 204 of readiness level evaluator 102 installs the automation software in question in industrial facility 101 to control the appropriate industrial floor infrastructure (i.e., the industrial floor infrastructure that utilized the required percentage of capabilities of the automation software, including the updated automation software). That is, installation engine 204 installs the automation software in question in industrial facility 101 when both the industrial floor infrastructure and the automation software are at the appropriate readiness level.

As stated above, in one embodiment, installation engine 204 installs the automation software, such as the updated automated software, in industrial facility 101 using various software tools, including, but not limited to, Atera®, Atlassian Bamboo, Jenkins®, TeamCity®, ElectricFlow®, etc.

Referring to operation 404, if the percentage of capabilities of the updated automation software that are being utilized by the existing industrial floor infrastructure does not exceed the threshold value thereby indicating that the capabilities of the industrial floor infrastructure being utilized by the automation software and vice-versa are not at an acceptable level, then, in operation 407, analyzing engine 201 stores the result of the analysis in the knowledge corpus, which resides in database 106. Such knowledge will be used by recommendation engine 203 to provide the appropriate recommendation(s).

In operation 408, recommendation engine 203 of readiness level evaluator 102 provides a recommendation(s) to address the situation in which the percentage of capabilities of the updated automation software that are being utilized by the existing industrial floor infrastructure does not exceed a threshold value, which may be user-specified.

As discussed above, in one embodiment, in the situation in which the percentage of capabilities of the updated automation software that are being utilized by the existing industrial floor infrastructure does not exceed a threshold value, recommendation engine 203 is configured to provide a recommendation(s) to upgrade, replace, install and/or perform proactive maintenance of the industrial floor infrastructure to further utilize the capabilities of the updated automation software based on the knowledge corpus, which includes a collection of data that contains information pertaining to which specified capabilities of specified industrial floor infrastructure (e.g., machines, devices, robots, etc.) were successfully controlled by which types and versions of the automation software. For example, the capability of the updated automation software (e.g., ABB® Arc Welding FlexTrainer by ABB®) pertaining to controlling welding equipment along multiple axes may not be utilized with the current industrial floor infrastructure since the current industrial floor infrastructure utilizes the welding equipment of Kuka® KR Cybertech, which cannot perform such an operation using the updated automation software. As a result, recommendation engine 203 may analyze the knowledge corpus for equivalent welding equipment that can be controlled along multiple axes by the updated automation software (e.g., ABB® Arc Welding FlexTrainer by ABB®). Upon identifying the welding equipment of Fanuc® ARC Mate 0iA in the knowledge corpus as being able to be controlled by the updated automation software (e.g., ABB® Arc Welding FlexTrainer by ABB®), recommendation engine 203 provides a recommendation to replace the welding equipment of Kuka® KR Cybertech with the welding equipment of Fanuc® ARC Mate 0iA or to simply install the welding equipment of Fanuc® ARC Mate 0iA to be added to the current industrial floor infrastructure.

In one embodiment, recommendation engine 203 utilizes the k-nearest neighbors algorithm to provide such recommendations using the knowledge corpus. In one embodiment, the k-nearest neighbors algorithm works by finding the k nearest neighbors of a given item (e.g., capability of industrial floor infrastructure, capability of automation software). The neighbors are then used to vote on the rating of the item. The algorithm then uses the average of the votes to predict the rating of the item.

In one embodiment, recommendation engine 203 provides such recommendations using the knowledge corpus by recommendation engine 203 using a machine learning algorithm to build and train a model (machine learning model) to identify the recommendation to address the situation discussed above (the percentage of capabilities of the updated automation software that are being utilized by the existing industrial floor infrastructure does not exceed a threshold value) using a sample data set that includes capabilities of the industrial floor infrastructure and the capabilities of the automation software. In one embodiment, such a sample data set is compiled by an expert.

Furthermore, such a sample data set is referred to herein as the "training data," which is used by the machine learning algorithm to make predictions or decisions as to the appropriate recommendation to be provided to address the situation discussed above based on the training data. The algorithm iteratively makes predictions of the appropriate recommendations to address the situation discussed above until the predictions achieve the desired accuracy as determined by an expert. Examples of such learning algorithms include nearest neighbor, Naïve Bayes, decision trees, linear regression, support vector machines and neural networks.

In one embodiment, such a recommendation(s), as discussed above, are issued to the user of readiness level evaluator 102, such as by displaying such a recommendation (s) to the user of readiness level evaluator 102 on the graphical user interface of readiness level evaluator 102.

Upon the display of the recommendation, the user may accept such a recommendation, such as by selecting an acceptance option displayed to the user on the graphical user interface on readiness level evaluator 102. The user may then proceed to implement such a recommendation, such as upgrading, replacing, installing and/or performing proactive maintenance of the industrial floor infrastructure. Upon upgrading, replacing, installing and/or performing proactive maintenance of the industrial floor infrastructure, the industrial floor infrastructure may be said to include "upgraded capabilities."

In operation 409, simulator engine 202 of readiness level evaluator 102 creates a digital twin simulation of the industrial floor infrastructure with upgraded capabilities utilizing the automation software, including any updates to the automation software. Simulator engine 202 creates such a digital twin simulation in the same manner as discussed above in connection with operation 402.

As stated above, in one embodiment, simulator engine 202 utilizes various software tools for creating such a digital twin simulation, including, but not limited to, Vention®, aPriori® Digital Manufacturing Simulation Software, Autodesk® Digital Twin, XMPro®, Predix®, Mimic® Simulation, Ansys® Twin Builder, 7bridges, Akka®, etc.

In operation 410, simulator engine 202 of readiness level evaluator 102 executes the created digital twin simulation of operation 409 to analyze the capabilities of the industrial floor infrastructure with upgraded capabilities in view of the automation software, including updates, to identify capabilities of the industrial floor infrastructure with upgraded capabilities that are utilized by the automation software, including the updated automation software. Based on such a simulation, analyzing engine 201 determines if the automation software, including the updated automation software, has the readiness level for utilizing the capabilities of the industrial floor infrastructure with upgraded capabilities as discussed further below.

As discussed above, in one embodiment, simulator engine 202 utilizes various software tools for executing such a digital twin simulation, including, but not limited to, Vention®, aPriori® Digital Manufacturing Simulation Software, Autodesk® Digital Twin, XMPro®, Predix®, Mimic® Simulation, Ansys® Twin Builder, 7bridges, Akka®, etc.

Referring now to FIG. 4B, in conjunction with FIGS. 1-3, in operation 411, analyzing engine 201 of readiness level evaluator 102 determines whether the percentage of capabilities of the industrial floor infrastructure with the upgraded capabilities that are being utilized by the automation software, including the updated automation software, exceeds a threshold value, which may be user-selected.

For example, in one embodiment, the capabilities of the industrial floor infrastructure may be provided to analyzing engine 201 from server 104 and/or simulation engine 202. In one embodiment, such capabilities are tabulated to form a list of capabilities for each particular machine, device, robot, etc. of the industrial floor infrastructure, such as loading and unloading parts, material handling, transferring finished parts to post-processing, drilling, welding, painting, product inspection, picking and placing, die casting, glass making, grinding, etc., which is stored in a storage device (e.g., storage device 311, 315) of readiness level evaluator 102.

Based on the analysis of the digital twin simulation, analyzing engine 201 determines which of the capabilities in the list of capabilities of the industrial floor infrastructure with upgraded capabilities are being utilized by the automation software, including the updated automation software.

In one embodiment, analyzing engine 201 utilizes various software tools for analyzing the digital twin simulation to determines which of the capabilities of the industrial floor infrastructure with upgraded capabilities are being utilized by the automation software, including the updated automation software, including, but not limited to, aPriori® Digital Manufacturing Simulation Software, Autodesk® Digital Twin, XMPro®, Predix®, Mimic® Simulation, Ansys® Twin Builder, 7bridges, Akka®, etc.

If the percentage of capabilities of the industrial floor infrastructure with the upgraded capabilities that are being utilized by the automation software, including the updated automation software, exceeds a threshold value (e.g., user-specified threshold value) thereby indicating that the capabilities of the industrial floor infrastructure being utilized by the automation software and vice-versa are at an acceptable level, then, in operation 412, analyzing engine 201 of readiness level evaluator 102 stores the result of the analysis in the knowledge corpus, which resides in database 106. Such knowledge will be used by recommendation engine 203 to provide the appropriate recommendation(s).

As previously discussed, a "knowledge corpus," as used herein, refers to a collection of data that contains information pertaining to particular types and versions of automation software that were successfully used to control various specified capabilities of specified industrial floor infrastructure (e.g., machines, devices, robots, etc.) and which specified capabilities of specified industrial floor infrastructure (e.g., machines, devices, robots, etc.) were successfully controlled by which types and versions of automation software.

In operation 413, installation engine 204 of readiness level evaluator 102 installs the automation software in question (i.e., the automation software, including the updated automation software, which utilized the required percentage of capabilities of the industrial floor infrastructure, including the upgraded industrial floor infrastructure). That is, installation engine 204 installs the automation software in question in industrial facility 101 when both the industrial floor infrastructure and the automation software are at the appropriate readiness level.

As stated above, in one embodiment, installation engine 204 installs the automation software, such as the updated automated software, in industrial facility 101 using various software tools, including, but not limited to, Atera®, Atlassian Bamboo, Jenkins®, TeamCity®, ElectricFlow®, etc.

Returning to operation 411, if, however, the percentage of capabilities of the industrial floor infrastructure with the upgraded capabilities that are being utilized by the automation software, including the updated automation software, does not exceed a threshold value (e.g., user-specified threshold value), then, in operation 414, analyzing engine 201 of readiness level evaluator 102 stores the result of the analysis in the knowledge corpus, which resides in database 106. Such knowledge will be used by recommendation engine 203 to provide the appropriate recommendation(s).

In operation 415, recommendation engine 203 of readiness level evaluator 102 provides a recommendation(s) to address the situation in which the percentage of capabilities of the industrial floor infrastructure with the upgraded capabilities that are being utilized by the automation software, including the updated automation software, does not exceed a threshold value, which may be user-specified.

As discussed above, in one embodiment, in the situation in which the percentage of capabilities of the industrial floor infrastructure with the upgraded capabilities that are being utilized by the automation software, including the updated automation software, does not exceed a threshold value, recommendation engine 203 is configured to provide a recommendation(s) to update, upgrade or replace the automation software, including updating the version of the automation software or entirely replacing the automation software with an alternative automation software, based on the knowledge corpus, which includes a collection of data that contains information pertaining to particular types and versions of automation software that were successfully used to control various specified capabilities of specified industrial floor infrastructure (e.g., machines, devices, robots, etc.). For example, the capability of controlling the welding equipment of Fanuc® ARC Mate 0iB along multiple axes was not utilized by the updated automation software (e.g., version 3 of ABBR Arc Welding FlexTrainer by ABB®). As a result, recommendation engine 203 may analyze the knowledge corpus for automation software with the capability of controlling the welding equipment of Fanuc® ARC Mate 0iB along multiple axes. In such a knowledge corpus, it may indicate that version 4 of ABB® Arc Welding FlexTrainer by ABB® has the capability of controlling the welding equipment of Fanuc® ARC Mate 0iB along multiple axes. As a result, recommendation engine 203 recommends to update the automation software by updating the version of the automation software (e.g., use version 4 of ABB® Arc Welding FlexTrainer as opposed to version 3 of ABB® Arc Welding FlexTrainer).

In one embodiment, recommendation engine 203 utilizes the k-nearest neighbors algorithm to provide such recommendations using the knowledge corpus. In one embodiment, the k-nearest neighbors algorithm works by finding the k nearest neighbors of a given item (e.g., capability of industrial floor infrastructure, capability of automation software). The neighbors are then used to vote on the rating of the item. The algorithm then uses the average of the votes to predict the rating of the item.

In one embodiment, recommendation engine 203 provides such recommendations using the knowledge corpus by recommendation engine 203 using a machine learning algorithm to build and train a model (machine learning model) to identify the recommendation to address the situation discussed above (the percentage of capabilities of the industrial floor infrastructure with the upgraded capabilities that are being utilized by the automation software, including the updated automation software, does not exceed a threshold value) using a sample data set that includes capabilities of the industrial floor infrastructure and the capabilities of automation software. In one embodiment, such a sample data set is compiled by an expert.

Furthermore, such a sample data set is referred to herein as the "training data," which is used by the machine learning algorithm to make predictions or decisions as to the appropriate recommendation to be provided to address the situation discussed above based on the training data. The algorithm iteratively makes predictions of the appropriate recommendations to address the situation discussed above until the predictions achieve the desired accuracy as determined by an expert. Examples of such learning algorithms include nearest neighbor, Naïve Bayes, decision trees, linear regression, support vector machines and neural networks.

In one embodiment, such a recommendation(s), as discussed above, are issued to the user of readiness level evaluator 102, such as by displaying such a recommendation (s) to the user of readiness level evaluator 102 on the graphical user interface of readiness level evaluator 102.

Upon the display of the recommendation, the user may accept such a recommendation, such as by selecting an acceptance option displayed to the user on the graphical user interface of readiness level evaluator 102. The user may then proceed to implement such a recommendation, such as updating, upgrading or replacing the automation software (e.g., updating version of automation software, replacing automation software with an alternative automation software).

Upon updating, upgrading or replacing the automation software, simulator engine 202 of readiness level evaluator 102 creates a digital twin simulation of the industrial floor infrastructure, including the industrial floor infrastructure with the upgraded capabilities, utilizing the updated, upgraded or newly selected automation software as discussed above in connection with operation 402.

As a result of the foregoing, the readiness level in the industrial floor infrastructure and automation software are evaluated to ensure that the appropriate automation software is being utilized to control the appropriate industrial floor infrastructure.

Furthermore, the principles of the present disclosure improve the technology or technical field involving industrial floor infrastructure. As discussed above, industrial floor infrastructure (e.g., machines, devices, robots, etc.) requires software (referred to herein as "automation software") to control such industrial floor infrastructure. Automation software are applications that minimize the need for human input and are designed to turn repeatable, routine tasks into automated actions. Different versions of automation software possess different capabilities in automating industrial floor infrastructure. Similarly, industrial floor infrastructure (e.g., machines, devices, robots, etc.) have different capabilities requiring automation software with different features to control such capabilities. For example, different versions of automation software may control different capabilities (e.g., cutting, painting, assembling, welding, etc.) of the various machines, devices, robots, etc. of the industrial floor infrastructure. In another example, different machines, devices, robots, etc. of the industrial floor infrastructure require the appropriate automation software to be installed in order to correctly control all the capabilities of the industrial floor infrastructure. Hence, the capabilities of the industrial floor infrastructure need to be able to be controlled by the features of the automation software and the capabilities of the automation software need to be fully utilized to control the industrial floor infrastructure. As a result, there needs to be a readiness validation (assessing the state of the industrial floor infrastructure to be prepared to utilize the automation software and assessing the state of the automation software to be prepared to control the industrial floor infrastructure) for both the industrial floor infrastructure and the automation software so that the appropriate automation software is being utilized to control the appropriate industrial floor infrastructure. For example, the automation software and industrial floor infrastructure should have the same level of readiness with respect to each other so that the capabilities of the industrial floor infrastructure to the greatest extent are controlled by the automation software and the capabilities of the automation software to the greatest extent are utilized to control the industrial floor infrastructure. For instance, if the industrial floor infrastructure does not possess the capabilities that the automation software is programed to control, then such automation software should not be installed in the industrial facility. Similarly, if the industrial floor infrastructure possesses capabilities that the automation software is not programed to control, then such automation software should not be installed in the industrial facility. Unfortunately, there is not currently a means for evaluating the readiness level in the industrial floor infrastructure and automation software to ensure that the appropriate automation software is being utilized to control the appropriate industrial floor infrastructure.

Embodiments of the present disclosure improve such technology by creating and executing a digital twin simulation to analyze the capabilities of the industrial floor infrastructure in view of an update to the automation software to identify capabilities of the updated automation software that are utilized by the existing capabilities of the industrial floor infrastructure. Recommendations may then be provided to upgrade, replace, install and/or perform proactive maintenance of the industrial floor infrastructure to further utilize the capabilities of the updated automation software if the capabilities of the updated automation software are not being utilized with the existing capabilities of the industrial floor infrastructure at an acceptable level. Furthermore, in one embodiment, a digital twin simulation is created and executed to analyze the capabilities of the industrial floor infrastructure with upgraded capabilities (after upgrading, replacing, installing and/or performing proactive maintenance of the industrial floor infrastructure) in view of the update to the automation software to identify capabilities of the industrial floor infrastructure with upgraded capabilities that are utilized by the updated automation software. Recommendations may then be provided to further update, upgrade or replace the updated automation software if the capabilities of the industrial floor infrastructure with upgraded capabilities are not being utilized by the automation software, including with the update, at an acceptable level. Such a process of evaluating the readiness level of both the industrial floor infrastructure and the automation software continues until the capabilities of the industrial floor infrastructure being utilized by the automation software and vice-versa are at an acceptable level thereby ensuring that the appropriate automation software is being utilized to control the appropriate industrial floor infrastructure. In this manner, the readiness level in the industrial floor infrastructure and automation software are evaluated to ensure that the appropriate automation software is being utilized to control the appropriate industrial floor infrastructure. Furthermore, in this manner, there is an improvement in the technical field involving industrial floor infrastructure.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for readiness validation of industrial floor infrastructure and automation software, the method comprising:

creating a digital twin simulation of the industrial floor infrastructure utilizing the automation software with an update;

executing the digital twin simulation to analyze capabilities of the industrial floor infrastructure in view of the update to the automation software to identify capabilities of the updated automation software that are utilized with existing capabilities of the industrial floor infrastructure and identify one or more unsupported capabilities of the updated automation software that are not supported by the industrial floor infrastructure;

installing the updated automation software to control the industrial floor infrastructure in response to a percentage of the capabilities of the updated automation software that are utilized with the existing capabilities of the industrial floor infrastructure exceeding a threshold value; and providing one or more recommendations to upgrade the capabilities of the industrial floor infrastructure to further utilize the one or more unsupported capabilities of the updated automation software.

2. The method as recited in claim 1, wherein the threshold value is a user-specified threshold value.

3. The method as recited in claim 1, wherein providing the one or more recommendations further comprises:

providing the one or more recommendations to a user to upgrade the capabilities of the industrial floor infrastructure to further utilize the one or more unsupported capabilities of the updated automation software based on a knowledge corpus, wherein the one or more recommendations is are provided based on the knowledge corpus using a k-nearest neighbors algorithm or a machine learning model; and creating a second digital twin simulation of the industrial floor infrastructure with the upgraded capabilities utilizing the updated automation software.

4. The method as recited in claim 1 further comprising:

providing the one or more recommendations to upgrade the industrial floor infrastructure using a knowledge corpus.

5. The method as recited in claim 1 further comprising:

providing the one or more recommendations to upgrade the industrial floor infrastructure using a knowledge corpus in response to having a percentage of capabilities of the updated automation software being utilized by the industrial floor infrastructure not exceeding the threshold value.

6. The method as recited in claim 1 further comprising:

upgrading, replacing, installing and/or performing proactive maintenance of the industrial floor infrastructure forming an industrial floor infrastructure with upgraded capabilities using a knowledge corpus;

creating a second digital twin simulation of the industrial floor infrastructure with upgraded capabilities utilizing the updated automation software; and executing the second digital twin simulation to analyze capabilities of the industrial floor infrastructure with upgraded capabilities in view of the update to the automation software to identify capabilities of the industrial floor infrastructure with the upgraded capabilities that are utilized by the updated automation software.

7. The method as recited in claim 6 further comprising:

storing a result of the execution of the second digital twin simulation in the knowledge corpus; and providing one or more recommendations to update, upgrade or replace the updated automation software using the knowledge corpus in response to having a percentage of capabilities of the industrial floor infrastructure with the upgraded capabilities being utilized by the automation software with the update not exceeding the threshold value.

8. A computer program product for readiness validation of industrial floor infrastructure and automation software, the computer program product comprising one or more computer readable storage mediums having program code embodied therewith, the program code comprising programming instructions for:

creating a digital twin simulation of the industrial floor infrastructure utilizing the automation software with an update;

executing the digital twin simulation to analyze capabilities of the industrial floor infrastructure in view of the update to the automation software to identify capabilities of the updated automation software that are utilized with existing capabilities of the industrial floor infrastructure and identify one or more unsupported capabilities of the updated automation software that are not supported by the industrial floor infrastructure; installing the updated automation software to control the industrial floor infrastructure in response to a percentage of the capabilities of the updated automation software that are utilized with the existing capabilities of the industrial floor infrastructure exceeding a threshold value; and providing one or more recommendations to upgrade the capabilities of the industrial floor infrastructure to further utilize the one or more unsupported capabilities of the updated automation software.

9. The computer program product as recited in claim 8, wherein the threshold value is a user-specified threshold value.

10. The computer program product as recited in claim 8, wherein providing the one or more recommendations further comprises:

providing the one or more recommendations to a user to upgrade the capabilities of the industrial floor infrastructure to further utilize the one or more unsupported capabilities of the updated automation software based on a knowledge corpus in response to the percentage of capabilities of the updated automation software that are being utilized by the industrial floor infrastructure not exceeding the threshold value, wherein the one or more recommendations is are provided based on the knowledge corpus using a k-nearest neighbors algorithm or a machine learning model; and creating a second digital twin simulation of the industrial floor infrastructure with the upgraded capabilities utilizing the updated automation software.

11. The computer program product as recited in claim 8, wherein the program code further comprises the programming instructions for:

providing the one or more recommendations to upgrade the industrial floor infrastructure using a knowledge corpus.

12. The computer program product as recited in claim 8, wherein the program code further comprises the programming instructions for:

providing the one or more recommendations to upgrade the industrial floor infrastructure using a knowledge corpus in response to having a percentage of capabilities of the updated automation software being utilized by the industrial floor infrastructure not exceeding the threshold value.

13. The computer program product as recited in claim 8, wherein the program code further comprises the programming instructions for:

upgrading, replacing, installing and/or performing proactive maintenance of the industrial floor infrastructure forming an industrial floor infrastructure with upgraded capabilities using a knowledge corpus;

creating a second digital twin simulation of the industrial floor infrastructure with upgraded capabilities utilizing the updated automation software; and executing the second digital twin simulation to analyze capabilities of the industrial floor infrastructure with upgraded capabilities in view of the update to the automation software to identify capabilities of the industrial floor infrastructure with the upgraded capabilities that are utilized by the updated automation software.

14. The computer program product as recited in claim 13, wherein the program code further comprises the programming instructions for:

storing a result of the execution of the second digital twin simulation in the knowledge corpus; and providing one or more recommendations to update, upgrade or replace the updated automation software using the knowledge corpus in response to having a percentage of capabilities of the industrial floor infrastructure with the upgraded capabilities being utilized by the automation software with the update not exceeding the threshold value.

15. A system, comprising:

a memory for storing a computer program for readiness validation of industrial floor infrastructure and automation software; and a processor connected to the memory, wherein the processor is configured to execute program instructions of the computer program comprising:

creating a digital twin simulation of the industrial floor infrastructure utilizing the automation software with an update;

executing the digital twin simulation to analyze capabilities of the industrial floor infrastructure in view of the update to the automation software to identify capabilities of the updated automation software that are utilized with existing capabilities of the industrial floor infrastructure and identify one or more unsupported capabilities of the updated automation software that are not supported by the industrial floor infrastructure; installing the updated automation software to control the industrial floor infrastructure in response to a percentage of the capabilities of the updated automation software that are utilized with the existing capabilities of the industrial floor infrastructure exceeding a threshold value; and providing one or more recommendations to upgrade the capabilities of the industrial floor infrastructure to further utilize the one or more unsupported capabilities of the updated automation software.

16. The system as recited in claim 15, wherein the threshold value is a user-specified threshold value.

17. The system as recited in claim 15, wherein providing the one or more recommendations further comprises: providing the one or more recommendations to a user to upgrade the capabilities of the industrial floor infrastructure to further utilize the one or more unsupported capabilities of the updated automation software based on a knowledge corpus in response to the percentage of capabilities of the updated automation software that are being utilized by the industrial floor infrastructure not exceeding the threshold value, wherein the one or more recommendations are provided based on the knowledge corpus using a k-nearest neighbors algorithm or a machine learning model; and creating a second digital twin simulation of the industrial floor infrastructure with the upgraded capabilities utilizing the updated automation software.

18. The system as recited in claim 15, wherein the program instructions of the computer program further comprise:

providing the one or more recommendations to upgrade the industrial floor infrastructure using a knowledge corpus.

19. The system as recited in claim 15, wherein the program instructions of the computer program further comprise:

providing the one or more recommendations to upgrade the industrial floor infrastructure using a knowledge corpus in response to having a percentage of capabilities of the updated automation software being utilized by the industrial floor infrastructure not exceeding the threshold value.

20. The system as recited in claim 15, wherein the program instructions of the computer program further comprise:

upgrading, replacing, installing and/or performing proactive maintenance of the industrial floor infrastructure forming an industrial floor infrastructure with upgraded capabilities using a knowledge corpus;

creating a second digital twin simulation of the industrial floor infrastructure with upgraded capabilities utilizing the updated automation software; and executing the second digital twin simulation to analyze capabilities of the industrial floor infrastructure with upgraded capabilities in view of the update to the automation software to identify capabilities of the industrial floor infrastructure with the upgraded capabilities that are utilized by the updated automation software.

* * * * *